United States Patent
Bissonnette et al.

(10) Patent No.: US 7,191,487 B2
(45) Date of Patent: Mar. 20, 2007

(54) VEHICLE WIPER APPARATUS WITH ENERGY ABSORPTION COLLAPSIBLE PIVOT SHAFT

(75) Inventors: Lee A. Bissonnette, Clarkston, MI (US); George C. Thompson, Rochester, NY (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 535 days.

(21) Appl. No.: 10/331,536

(22) Filed: Dec. 30, 2002

(65) Prior Publication Data

US 2004/0123413 A1 Jul. 1, 2004

(51) Int. Cl.
*B60S 1/34* (2006.01)
*B60S 1/16* (2006.01)

(52) U.S. Cl. ............. 15/250.31; 15/250.3; 403/DIG. 3; 403/2; 29/428

(58) Field of Classification Search ............... 15/250.3, 15/250.31, 250.34; 296/96.15, 96.17; 403/2, 403/DIG. 3; 29/428
See application file for complete search history.

(56) References Cited

U.S. PATENT DOCUMENTS

| | | | |
|---|---|---|---|
| 4,718,712 A | 1/1988 | Nakatani | |
| 4,943,102 A | 7/1990 | Hamamoto et al. | |
| 6,216,309 B1 | 4/2001 | Goto et al. | |
| 6,237,185 B1 | 5/2001 | Goto et al. | |
| 6,254,167 B1 | 7/2001 | Goto et al. | |
| 6,505,376 B1 | 1/2003 | Kagawa | |
| 6,513,186 B1 * | 2/2003 | Zimmer | 15/250.31 |
| 6,941,611 B2 * | 9/2005 | Kashiwagi et al. | 15/250.31 |
| 2001/0001336 A1 | 5/2001 | Kobayashi et al. | |
| 2001/0011831 A1 | 8/2001 | Ohashi et al. | |
| 2002/0083544 A1 | 7/2002 | Masuda | |
| 2003/0001407 A1 | 1/2003 | Hoshikawa et al. | |

FOREIGN PATENT DOCUMENTS

| | | |
|---|---|---|
| DE | 2830772 | 7/1978 |
| DE | 19903140 A1 | 1/1999 |
| EP | 0 916 559 | 5/1999 |
| EP | 1 074 442 | 2/2001 |
| EP | 1 083 101 | 3/2001 |
| GB | 2 327 598 | 2/1999 |
| GB | 2 347 340 | 9/2000 |
| JP | 11165613 | 6/1999 |
| JP | 11 301420 | 11/1999 |
| JP | 2000062575 | 2/2000 |
| JP | 2000326830 | 11/2000 |
| JP | 20000326830 | 11/2000 |

* cited by examiner

*Primary Examiner*—Gary K. Graham
(74) *Attorney, Agent, or Firm*—Young Basile

(57) ABSTRACT

A wiper apparatus for a vehicle window has a wiper arm pivot rotatably mounted in a pivot holder fixedly securable to vehicle structure. An end portion of the wiper arm pivot normally extends exteriorly of an impact line defined by vehicle structure. The wiper arm pivot includes an inner pivot shaft telescopingly displacable with respect to an outer pivot shaft upon the imposition of an impact load on the exterior end of the wiper arm pivot. A first pin separably holds the inner pivot shaft to the outer pivot shaft at a first position. An energy absorption material mass is disposed between the inner pivot shaft and the outer pivot shaft to control the telescoping movement of the inner pivot shaft in the outer pivot shaft and to absorb impact forces acting on the inner pivot shaft. A second fixed pin is carried by the outer pivot shaft and limits movement of the inner pivot shaft to a second position adapted for temporary operation of the wiper apparatus.

45 Claims, 2 Drawing Sheets

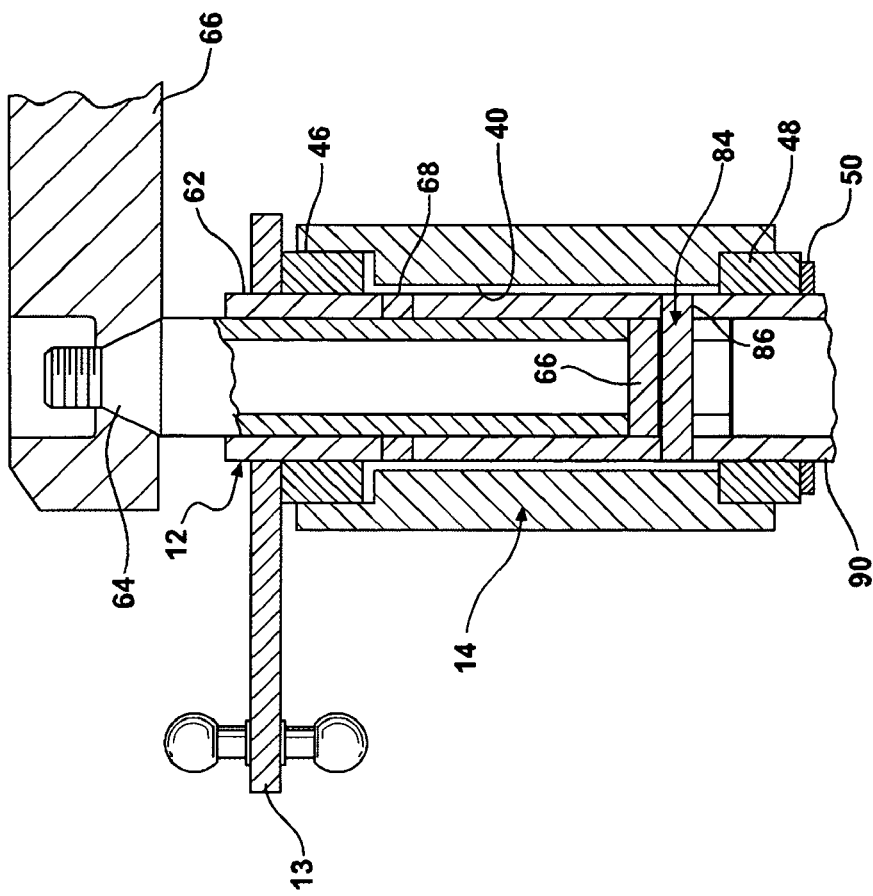
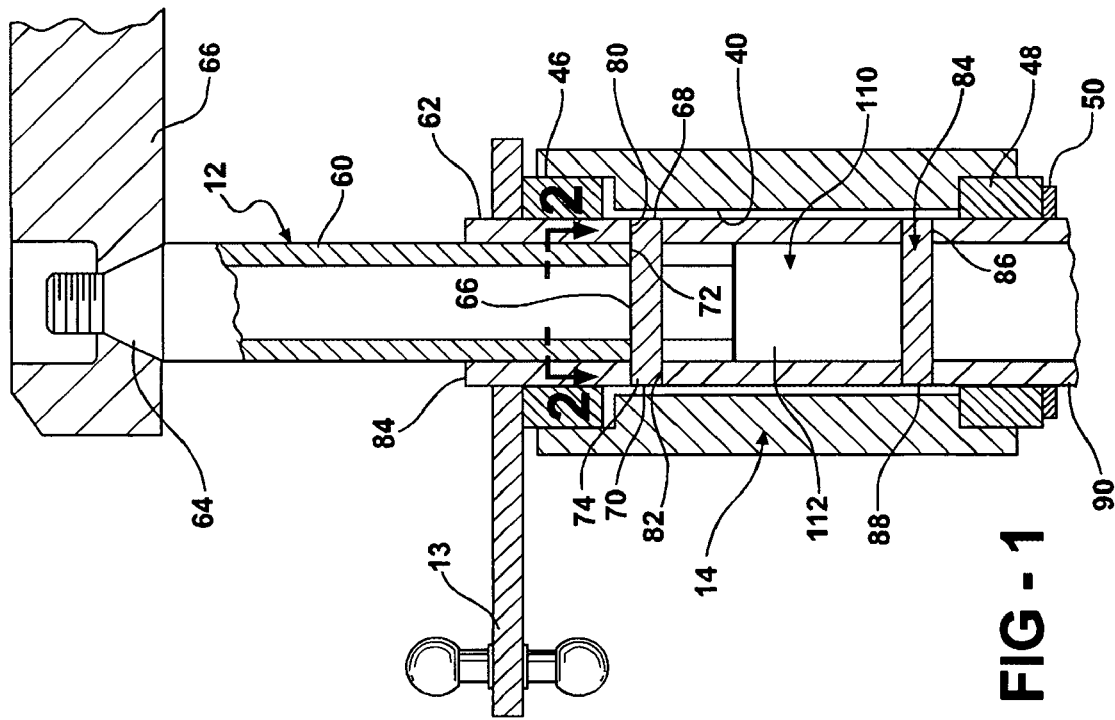

VEHICLE WIPER APPARATUS WITH ENERGY ABSORPTION COLLAPSIBLE PIVOT SHAFT

BACKGROUND

The present invention relates, in general, to vehicle windshield wiper assemblies and, more specifically, to vehicle windshield wiper assemblies having pedestrian collision safety features.

In vehicle windshield wiper assemblies, wiper blades are mounted on wiper arms. The wiper arms, in turn, carry a mount which is attached to a rotatable pivot shaft. The pivot shaft is rotatably mounted in a pivot shaft housing or holder fixedly mounted on vehicle structure, such as on the vehicle plenum or cowl panel immediately below the lower edge of the vehicle windshield. Although two wiper blades and wiper arms are normally provided on a single windshield, only one of the wiper pivot shafts is typically coupled by a drive lever to a drive source, such as an electric motor. Linkages connect the pivot shaft of one wiper arm to the pivot shaft of the other wiper arm to impart reciprocal motion to both pivot shafts when the motor reciprocally drives the drive lever.

Recent studies have shown that pedestrians have a high likelihood of injury when struck by a vehicle traveling at above certain speeds. Such injuries occur when the pedestrian is thrown by impact with the front bumper or front fenders of the vehicle hood onto the hood where the pedestrian's head and/or torso then contacts the windshield with considerable force.

Although windshield wiper assemblies are provided in a large number of different configurations, typical wiper assemblies have the upper end of the pivot shaft and the wiper arm attached thereto protruding above an impact line usually defined by the exterior surface of the vehicle hood. As the pivot shaft, although rotatable in the pivot holder, is nevertheless axially fixed relative to the vehicle structure, the protruding portions of the wiper assembly act as a fixed object or projection which increases the likelihood of serious injury to a pedestrian during a collision.

Certain countries or regional groups have initiated legislation to protect pedestrians and other road users in the event of a collision with a vehicle. Under such legislation, manufacturers will have to insure that the pivot shafts of windshield wiper assemblies do not act as an external projection during a pedestrian collision with a vehicle.

As a result, windshield wiper manufacturers have provided a number of different pivot shaft mounting arrangements which are capable of pivoting below the hood impact line or breaking away from the fixed mount to the vehicle structure and dropping below the vehicle hood so as to lower the protruding portion of the pivot shaft and the wiper arm below the impact line during a pedestrian collision.

However, providing a pivot shaft mounting design which is capable of pivotal movement under impact is directly opposed to the wiper system requirements of a solid mount for torsional loading and radial force management. In current pivot housing assemblies, the pivot shaft is solidly mounted in the axial direction in the pivot shaft housing. The pivot shaft is constrained within the pivot housing by various methods. One example utilizes a solid ring with full contact to the pivot shaft so as to exert a retaining force on the pivot assembly. Another example is an E-clip retaining ring that fits into a slot on the pivot shaft and mechanically retains the pivot shaft in the pivot shaft housing. On the other end of the pivot shaft, the pivot assembly is constrained by the interference caused by embedded knurling in the pivot shaft and the interference hole in the mating drive plate when the two pieces are mechanically riveted together.

While this current pivot shaft housing design has sufficient strength in both the axial and radial directions to meet current federal and customer requirements, the design is ineffective in minimizing injury from the impact load of a pedestrian.

Prior pivot shaft mounting designs which provide breakaway or pivot functions do not remain in a workable wiper operating position after movement thereby rendering the entire wiper system inoperative. This prevents the vehicle from being safely used after a collision to at least enable the driver to proceed home or to a repair location with reduced wiper operability.

A wiper apparatus has been designed with a pedestrian safety feature. This design uses an axially displacable, spring biased pivot shaft. A spring acts on a wiper arm pivot mounting to maintain the wiper pivot shaft in a normal wiper operating position. Impact forces acting on the wiper pivot shaft overcome the biasing force of the spring and enable the pivot shaft to axially displace under the impact forces below the vehicle hood impact line to prevent substantial contact between a pedestrian and the exposed portions of the pivot shaft during a pedestrian/vehicle collision. Once the impact forces are removed from the pivot shaft, the spring biases the pivot shaft back to the normal wiper operating position, assuming that minimal damage has been inflicted on the wiper arm and the pivot shaft.

What is still needed is a vehicle windshield wiper apparatus having a rotatable wiper pivot shaft which meets wiper system requirements for torsional and radial force loading while being capable of controlled axial displacement below the vehicle hood impact line to prevent substantial contact between a pedestrian and the exposed portions of the pivot shaft and/or wiper arm during a pedestrian/vehicle collision. It would also be desirable to provide a vehicle windshield wiper apparatus which provides energy absorption during pedestrian impact with the wiper arm and/or pivot shaft to minimize impact forces on the pedestrian and to provide a controlled collapse of the pivot shaft below the vehicle hood impact line. It would also be desirable to provide a vehicle windshield wiper apparatus having an axially displacable pivot shaft which is displacable below the vehicle hood impact line to a lowered position which still provides a reduced amount of wiper operability assuming minimal damage to the wiper arm and/or pivot shaft during a pedestrian/vehicle collision.

SUMMARY

The present invention is a vehicle wiper pivot housing with an energy absorbing, axially displacable pivot shaft which uniquely meets the requirements of solid wiper system mounting for torsional loading and radial force and an impact load pivot shaft displacement and energy absorption capability for pedestrian safety during a pedestrian/vehicle collision. This pedestrian safety feature is provided in a manner which enables the wiper pivot to be lowered under impact forces in a controlled, energy absorbing manner to a lowered position which minimizes the exposure of the pivot shaft and the wiper arm above the vehicle hood impact line while still positioning the pivot shaft and the wiper arm in an operable position providing at least a minimal amount of wiper operability for wiper operation during movement of the vehicle from the collision site.

In one aspect, the wiper apparatus includes a pivot holder which is adapted to be fixedly mounted to a vehicle. A wiper arm pivot is rotatably mounted in the pivot holder. The wiper arm pivot is adapted for carrying a wiper arm at one end. One end of the wiper pivot nominally extends exteriorly of a vehicle structure for receiving the wiper arm when the wiper pivot is in a normal wiping operation position. The wiper pivot is axially displacable under a predetermined impact force exerted on the exposed end of the wiper pivot in an amount to lower the exposed end of the wiper pivot below the surrounding vehicle structure with energy absorption for a controlled low impact collapse.

In another aspect, means are provided for axially fixing the inner pivot shaft to the outer pivot shaft in the first position. The fixing means is separable at a predetermined impact force to allow movement of the inner pivot shaft with respect to the outer pivot shaft from the first position. The fixing means is, by example, a pin extending through the inner pivot shaft to the outer pivot shaft.

The holding means also includes means carried in the outer pivot shaft and engaged by the inner pivot shaft for limiting movement of the inner pivot shaft at the second position. The limiting means is, by example, in the form of another pin extending through the outer pivot shaft.

In one aspect, the energy absorption means is a deformable mass carried in the outer pivot shaft. Preferably, the deformable mass includes voids or interstices. The interstices may be holes which decrease in one of average diameter or average number from one end of the mass to the other or increase in number or diameter from one end to the other end of the mass.

In another aspect, means are provided for guiding the telescoping movement of the inner pivot shaft relative to the outer pivot shaft. The guide means may comprise at least one or more complimentary projections and mating recess formed in the inner pivot shaft and the outer pivot shaft.

In another aspect of the invention, the guide means includes means for varying the resistance to movement of the inner pivot shaft in the outer pivot shaft as the inner pivot shaft moves from the first position toward the second position.

In another aspect of the invention, a method for manufacturing a wiper pivot apparatus capable of lowering a vehicle wiper arm attached to the pivot apparatus from a first normal wiping position to a second lower position under an impact force is disclosed. The method includes the steps of: A method for manufacturing a wiper pivot apparatus capable of lowering a vehicle wiper arm attached to the pivot apparatus from a first normal wiping position to a second lower position under a predetermined impact force, the method comprising the steps of:

mounting a wiper arm pivot adapted to carry a wiper arm at a first end and a pivot holder adapted to be fixed to a vehicle;

forming the wiper arm pivot of an inner pivot shaft telescopingly movable from a first position placing the wiper arm in a normal wipe position on the vehicle to a second position telescoped within the outer pivot shaft and axially fixed with respect to the pivot holder; releasably fixing the inner pivot shaft at the first position to the outer pivot shaft, the inner pivot shaft released from the fixed first position at a predetermined force acting on the inner pivot shaft; and placing energy absorption material between the inner pivot shaft and the outer pivot shaft to control the telescoping movement of the inner pivot shaft between the first and seconds positions.

The wiper apparatus of the present invention provides a unique axially displacable wiper arm pivot which is capable of axial displacement relative to the surrounding fixed pivot holder upon the imposition of a predetermined impact force on an end of the wiper arm pivot normally exposed above a hood impact line with energy absorption. The axial displacement is controlled to allow the external end of the wiper arm pivot to retract below the surrounding vehicle structure to minimize fixed contact between the wiper arm pivot and a pedestrian impacting with the vehicle structure during a collision. At the same time, the axial displacable wiper arm pivot retains sufficient strength in the axial and radial directions to provide a solid mount for torsional loading and radial force management for wiper arm movement.

BRIEF DESCRIPTION OF THE DRAWING

The various features, advantages and other uses of the present invention will become more apparent by referring to the following detailed description and drawing in which:

FIG. 1 is a partially cross-sectioned, side elevational view of a vehicle wiper pivot apparatus in accordance with one aspect of the present invention shown in a normal wiping position;

FIG. 4 is a cross-sectional view, similar to FIG. 1, but showing the position of the wiper pivot shaft after an impact on the exterior end of the pivot shaft.

DETAILED DESCRIPTION

Figure 2:
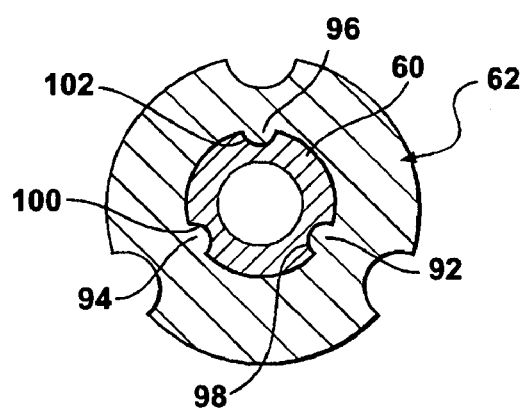
FIG. 2 is a cross-sectional view, generally taken along line 2—2 in FIG. 1.
Figure 3:
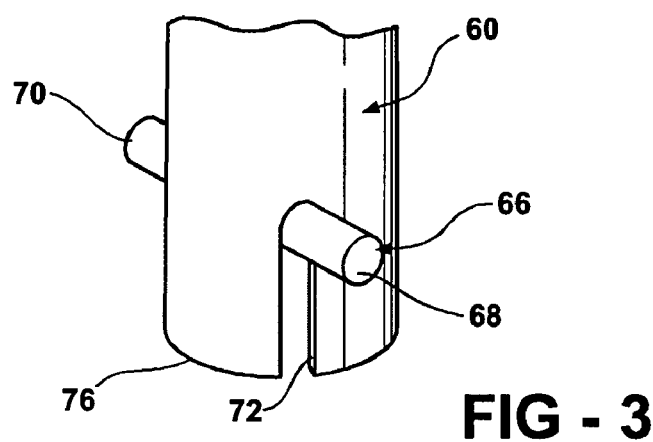
FIG. 3 is a partial, perspective view showing the normal mounting position of the inner pivot shaft and a first connector.

Referring now to FIGS. 1–3, there is depicted various aspects of a vehicle windshield wiper apparatus 10, which is only partially shown, as the present wiper apparatus 10 may be employed with many different wiper arm configurations.

As a large number of the components in a vehicle windshield wiper apparatus are conventional, such are not shown in order that the features of the present invention may be more clearly identified. However, it will be understood that the wiper apparatus 10 utilizes a drive motor connected by a drive lever 13 to a pivot shaft 12 rotatably mounted in a pivot shaft holder or housing 14.

As shown in FIG. 1, at least an upper, portion 30 of the pivot shaft 12 is disposed exteriorly of an impact line 32 which is generally formed by a major plane or edge of a vehicle hood, not shown. The exposed end 30 of the pivot shaft 12, which receives a not shown wiper arm, is disposed adjacent to a bottom edge of a vehicle windshield, also not shown.

The wiper pivot assembly 10 shown in FIG. 1 is a so-called "top drive" wiper system in that the drive lever 13 is mounted on top of one end of the pivot housing 14. The drive lever 13 is axially and rotatably fixed to the pivot shaft 12 by a press-fit joint or a clip 36, by example only. Movement of the drive plate 13 is generated by rotation of the output shaft of the wiper drive motor, not shown, which imparts bi-directional rotation to the pivot shaft 12 in a conventional manner. However, the clip 36 restrains the pivot shaft 12 in an upward direction with respect to the pivot housing 14.

Also mounted in the through bore 40 are first and second bushings 46 and 48 which are disposed between the inner surface of the bore 40 and the pivot shaft 12. Another retainer or C-clip 50 is disposed on the second end 44 of the pivot housing 14 and engages a slot formed at a second end 52 of the pivot shaft 12 to axially restrain the pivot shaft 12 relative to the pivot housing 14.

As shown in FIGS. 1–4, the pivot shaft 12 is formed of an inner pivot shaft 60 and a concentric, outer pivot shaft 62. The inner pivot shaft 60 may be is in the form of a tubular member which can be solid or hollow. An upper, outer end 64 of the inner pivot shaft 60 is formed with a suitable mount, such as knurlings, for a press-fit connection of a wiper arm head 66 thereon.

The inner pivot shaft 60 is axially displacable relative to the outer pivot shaft 62. However, the inner pivot shaft 60 is non-rotatably connected to the outer pivot shaft 62 by a first connector, such as a pin 66. The pin 66 is in the form of a tubular member having opposed first and second ends 68 and 70. The first and second ends 68 and 70 extend through aligned, diametrically opposed apertures 72 and 74 spaced from a lower end 76 of the inner pivot shaft 60 as shown in FIGS. 1 and 3. By way of example, the apertures 72 and 74 may be in the form of open ended slots extending from an open end at the second end 76 of the inner pivot shaft 60 to a closed inner end. The pin 66 extends through aligned apertures 80 and 82 in the outer pivot shaft 62 which apertures 80 and 82 are spaced from a first or upper end 84 of the outer pivot shaft 62. The location of the apertures 72 and 74 in the inner pivot shaft 60 and the apertures 80 and 82 in the outer pivot shaft 62 are positioned to dispose the upper end 64 of the inner pivot shaft 60 in a normal wiper arm position shown in FIG. 1.

A second connector or pin 84 extends through a second pair of aligned, diametrically opposed apertures 86 and 88 spaced from a second or lower end 90 of the outer pivot shaft 62. The connector or pin 84 is located approximately one quarter of the length of the outer pivot shaft 62 from the second end 90, by example only. This position of the second connector or pin 84 defines the fixed lowered position or limit of the inner pivot shaft 60 which places the upper end 64 of the inner pivot shaft 60 and the attached wiper arm 66 in a temporary use wiping position to provide at least a minimal amount of wiping capability to the vehicle after a collision.

The inner and outer pivot shafts 60 and 62 are fixed for simultaneous, unitary rotation by means of guide means shown more clearly in FIG. 2. By way of example only, the guide means includes at least one projection or lobe 92, with three equi-circumferentially spaced projection or lobes 92, 94 and 96 being depicted by way of example only. The lobe 92 extends radially inward from an inner surface of the outer pivot shaft 62. The inner pivot shaft 60 is formed with one or more complimentary recesses, with three equi-circumferentially spaced recesses 98, 100 and 102 being depicted by way of example only. The projections or lobes 92, 94 and 96 and the recesses 98, 100 and 102, respectively, are complementarity shaped and positioned for rotative interlocking as shown in FIG. 2 to enable equal and simultaneous rotation of the inner pivot shaft 60 and the outer pivot shaft 62 during pivotal movement of the drive lever 13; while still enabling axial displacement or sliding movement of the inner pivot shaft 60 relative to the outer pivot shaft 62. The position of the mating lobes and recesses may be reversed such that the projections or lobes may be formed in a radially outward extending manner on the inner pivot shaft 60 to seat within complimentary formed recesses carried in the inner surface of the outer pivot shaft 62.

The mating lobes 92, 94 and 96 and projections 98, 100 and 102 minimize backlash between the inner pivot shaft 60 and the outer pivot shaft 62 during the rotation of the entire pivot shaft 12.

The present invention uniquely includes an energy absorption means 110 which is carried between the outer pivot shaft 62 and the movable portions of the inner pivot shaft 60. Suitable plugs or caps may be provided in the outer pivot shaft 62 and the inner pivot shaft 60 to retain the energy absorption means 110 in the position shown in FIG. 1.

By way of example only, the energy absorption means is in the form of a collapsible matrix, such as a honeycomb nylon matrix in which a blow holes or cavities are formed within a nylon material mass. The blow holes form a means for controlling the deformation of the mass 110

The blow holes pictorially depicted by reference number 112 may be provided in a substantially constant distribution and a substantially constant diameter or size throughout the entire axial length of the energy absorption means or matrix 110. Alternately, the blow holes 112 may be provided in a varying diameter or size from a first or upper end to a second or lower end of the energy absorption matrix 110 to provide any desired energy absorption profile, such as an increasing force or energy absorption profile during axial displacement of the second end 76 of the inner pivot shaft 60 within the outer pivot shaft 62 or a decreasing force or energy absorption profile during axial displacement of the inner pivot shaft relative to the outer pivot shaft 62.

The collapsing energy absorption feature controls the axial displacement of the inner pivot shaft 60 relative to the outer pivot shaft 62 and absorbs a substantial portion of the impact forces exerted on the inner pivot shaft 60 which cause such axial displacement.

As soon as the impact force is exerted on the upper end 64 of the inner pivot shaft 60 exceeds the rigid structural force provided by the energy absorption means or matrix 110 in the normal mounting position shown in FIG. 1, the inner pivot shaft 60 will axial displace within the outer pivot shaft 62 thereby lowering the upper end 64 of the inner pivot shaft 60 below the vehicle hood impact line 32. The second end 76 of the inner pivot shaft 60 as well as the central portion of the connecting pin 66 will deform or crush the energy absorption matrix 110 during such axial displacement by collapsing the blow holes 112.

According to a unique feature of the present apparatus, the connector or pin 66 is provided with a breakaway feature such that the first and second ends 68 and 70 of the connector or pin 66 will break away or de-couple from a central portion of the pin 66 when the impact force exerted on the inner pivot shaft 60 exceeds a predetermined force equal to the shear strength of the connector 66. Prior to reaching this impact force level, the pin 66 holds the inner pivot shaft 60 in the normal wiper arm operating position shown in FIGS. 1 and 3. However, once the first and second ends 68 and 70 of the pin 66 de-couple from the central portion of the pin 66, the inner pivot shaft 60 is capable of axial displacement within the outer pivot shaft 62.

The energy absorption means or matrix 110 then comes into play to control the axial displacement or telescoping movement of the inner pivot shaft 60 within the outer pivot shaft 62. The guide means in the form of the mating lobes 92, 94 and 96 and the recesses 98, 100 and 102 maintain the inner pivot shaft 60 in a rotatably fixed position relative to the outer pivot shaft 62 during such axial displacement. This enables the apertures or slots 72 and 74 to engage the fixed pin 84 extending through a lower portion of the outer pivot shaft 62. The fixed pin 84 has a high shear strength so as not to shear or break away during any nominal magnitude of impact forces which may be exerted on the inner pivot shaft 60. The slots 72 and 74 in the inner pivot shaft 60 slide over the fixed pin 84 until the fixed pin 84 reaches the closed inner end of each slot 72 and 74.

When the fixed pin 84 engages the inner end of the slots 72 and 74, further axial displacement or telescoping movement of the inner pivot shaft 60 relative to the outer pivot shaft 62 ceases as shown in FIG. 4. This second or lowered position of the inner pivot shaft 60 defines a position for the upper end 64 of the inner pivot shaft 60 and the attached wiper arm 66 which affords at least a minimal amount of wiping capability assuming no substantial damage to the wiper apparatus during the collision. Thus, pivotal movement of the drive lever 13 by activation of the wiper motor will cause the inner and outer pivot shafts 60 and 62 to rotate in a normal manner to effect pivotal movement of the wiper arm 66 over the vehicle window. This affords a temporary capability to enable the vehicle to be moved from the collision site with at least a minimal amount of wiping capability.

Figure 5:
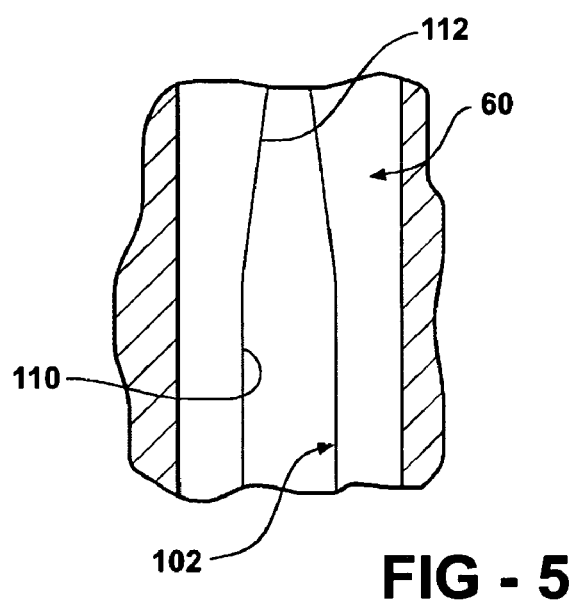
FIG. 5 is a partial, perspective view showing another aspect of the guide means of the present invention.

As shown in FIG. 5, the guide means may also include means for varying the resistance to axial translation of the inner pivot shaft 60 with respect to the outer pivot shaft 62. As shown in FIG. 5, the varying means may include means for varying the depth or width of one or more of the recesses 98, 100 and 102 so as to cause a change in the depth or width of the mating projection 92, 94 or 96 on the outer pivot shaft 62 as the inner pivot shaft 60 axially translates within the outer pivot shaft 62. The varying means may provide an increasing or decreasing resistance, with an increasing resistance being shown in FIG. 5 by varying the width of the recess 102 from a first constant width 110 to a gradually narrowing second width 112. The varying means may be gradual as in the form of the tapered recess width 112 shown in FIG. 5 or provided as a step function formed of a series of gradually decreasing or increasing widths or thicknesses of the recess 102.

The reverse is also true in that the varying means may be formed of a varying depth or thickness projection 96 in the outer pivot shaft 62 which is engaged by a constant diameter and depth recess 102 in the inner pivot shaft 60.

In summary, there has been disclosed a unique vehicle wiper apparatus which has a unique energy absorption capability to control and absorb impact forces exerted on an exposed end of an axially displacable inner pivot shaft so as to absorb such impact forces during lowering of the inner pivot shaft during a pedestrian/vehicle collision. This controlled energy absorption feature reduces the force exerted by the exposed portions of the wiper pivot shaft and the wiper arm on a pedestrian impacting with the vehicle in a safe, controlled manner. According to another feature of the present invention, the controlled telescoping displacement of the inner pivot shaft with respect to an outer pivot shaft is limited at a lowered position which affords a minimum amount of wiper operability.

What is claimed is:

1. A wiper apparatus for a vehicle comprising:
   a pivot holder adapted to be fixedly mounted to the vehicle;
   a wiper arm pivot rotatably mounted in the pivot holder, the pivot including an inner pivot shaft and an outer pivot shaft, the inner pivot shaft telescopingly mounted in the outer pivot shaft for movement between a first position in which a wiper arm mountable on the inner pivot shaft is disposed in a normal wiping position and a second position in which the inner pivot shaft is at least partially telescoped within the outer pivot shaft;
   means for releasably holding the inner pivot shaft in the first position relative to the outer pivot shaft, the holding means including means for axially fixing the inner pivot shaft to the outer pivot shaft in the first position, the fixing means subject to a force acting along an interface between an inner wall of the outer pivot shaft and an outer wall of the inner pivot shaft and shearable at a predetermined impact force to allow movement of the inner pivot shaft with respect to the outer pivot shaft from the first position; and
   energy absorption means, carried between the inner pivot shaft and the outer pivot shaft and acting against the inner pivot shaft, for controlling the movement of the inner pivot shaft from the first position to the second position under impact forces exceeding a predetermined force acting on the inner pivot shaft.

2. The wiper apparatus of claim 1 wherein:
   the second position is a position in which a wiper arm mounted on one end of the inner pivot shaft is disposed in a temporary wiping position displaced from a normal wiping position on the vehicle.

3. The wiper apparatus of claim 1 wherein the fixing means comprises:
   a pin extending through the inner pivot shaft to the outer pivot shaft.

4. The wiper apparatus of claim 1 further comprising:
   means carried in the outer pivot shaft and engaged by one end of the inner pivot shaft for limiting movement of the inner pivot shaft at a second position of the inner pivot shaft with respect to the outer pivot shaft.

5. The wiper apparatus of claim 4 wherein the limiting means comprises:
   a pin extending through the outer pivot shaft, the pin axially spaced from the holding means.

6. The wiper apparatus of claim 4 wherein the fixing means comprises:
   a pin extending through the inner pivot shaft to the outer pivot shaft.

7. The wiper apparatus of claim 4 wherein the holding means further comprises:
   a pair of open ended apertures formed in one end of the inner pivot shaft, the holding means extending through the apertures when the inner pivot shaft is in the first position.

8. The wiper apparatus of claim 1 wherein the energy absorption means comprises:
   a deformable mass carried in the outer pivot shaft.

9. The wiper apparatus of claim 8 wherein the mass comprises:
   means for controlling the deformation of the mass.

10. The wiper apparatus of claim 9 wherein the controlling means comprises:
    interstices formed through the mass.

11. The wiper apparatus of claim 10 wherein:
    the interstices are holes.

12. The wiper apparatus of claim 11 wherein:
    the holes decrease in average diameter from one end to the other end of the mass.

13. The wiper apparatus of claim 11 wherein:
    the holes decrease in average number from one end to the other end of the mass.

14. The wiper apparatus of claim 11 wherein:
the interstices increase in number from one end to another end of the mass.

15. The wiper apparatus of claim 11 wherein:
the interstices decrease in average size from one end to another end of the mass.

16. The wiper apparatus of claim 1 further comprising:
means for guiding telescoping movement of the inner pivot shaft relative to the outer pivot shaft.

17. The wiper apparatus of claim 16 wherein the guide means comprises:
at least one complimentary projection and at least one recess formed in the inner pivot shaft and the outer pivot shaft.

18. The wiper apparatus of claim 17 wherein the guide means further comprises:
a plurality of complimentary, circumferentially spaced projections and recesses formed in the inner pivot shaft and the outer pivot shaft.

19. The wiper apparatus of claim 16 wherein the guide means further comprises:
means for varying the resistance to movement of the inner pivot shaft in the outer pivot shaft as the inner pivot shaft moves from the first position toward the second position.

20. The wiper apparatus of claim 19 wherein the means for varying the resistance comprise:
means for increasing the resistance to movement of the inner pivot shaft relative to the outer pivot shaft as the inner pivot shaft moves from the first position toward the second position.

21. The wiper apparatus of claim 19 wherein the means for varying the resistance comprises:
means for decreasing the resistance to movement of the inner pivot shaft relative to the outer pivot shaft as the inner pivot shaft moves from the first position toward the second position.

22. The wiper apparatus of claim 1 wherein the holding means further comprises:
a pair of open ended apertures formed in one end of the inner pivot shaft, the holding means extending through the apertures when the inner pivot shaft is in the first position.

23. The wiper apparatus for a vehicle comprising:
a pivot holder adapted to be fixedly mounted to the vehicle;
a wiper arm pivot rotatably mounted in the pivot holder, the pivot including an inner pivot shaft and an outer pivot shaft, the inner pivot shaft telescopingly mounted in the outer pivot shaft for movement between a first position in which a wiper arm mountable on the inner pivot shaft is disposed in a normal wiping position and a second position in which the inner pivot shaft is at least partially telescoped within the outer pivot shaft;
means for axially fixing the inner pivot shaft to the outer pivot shaft in the first position, the fixing means being subject to a force acting along an interface between an inner wall of the outer pivot shaft and an outer wall of the inner pivot shaft and the fixing means shearable at a predetermined impact force to allow movement of the inner pivot shaft with respect to the outer pivot shaft from the first position;
means carried in the outer pivot shaft and engaged by one end of the inner pivot shaft for limiting movement of the inner pivot shaft at a second position of the inner pivot shaft with respect to the outer pivot shaft; and
a deformable energy absorption mass, carried between the inner pivot shaft and the outer pivot shaft and acting against the inner pivot shaft, for controlling the movement of the inner pivot shaft from the first position to the second position under impact forces exceeding a predetermined force acting on the inner pivot shaft.

24. The wiper apparatus of claim 23 wherein the fixing means comprises:
a pin extending through the inner pivot shaft to the outer pivot shaft.

25. The wiper apparatus of claim 23 wherein the limiting means comprises:
another pin extending through the outer pivot shaft, the other pin axially spaced from the holding means.

26. The wiper apparatus of claim 23 wherein the energy absorption mass comprises:
means for controlling the deformation of the mass.

27. The wiper apparatus of claim 23 further comprising:
means for guiding telescoping movement of the inner pivot shaft relative to the outer pivot shaft.

28. The wiper apparatus for a vehicle comprising:
a pivotally movable drive member;
a pivot holder adapted to be fixedly mounted to the vehicle;
a wiper arm pivot rotatably mounted in the pivot holder, the drive member fixed to the pivot;
the pivot including:
an inner pivot shaft and an outer pivot shaft, the inner pivot shaft telescopingly mounted in the outer pivot shaft for movement between a first position in which a wiper arm mountable on the inner pivot shaft is disposed in a normal wiping position and a second position in which the inner pivot shaft is at least partially telescoped within the outer pivot shaft;
means for releasably holding the inner pivot shaft in the first position relative to the outer pivot shaft, the holding means including means for axially fixing the inner pivot shaft to the outer pivot shaft in the first position, the fixing means subject to a force along an interface between an inner wall of the outer pivot shaft and an outer wall of the inner pivot shaft and shearable at a predetermined impact force to allow movement of the inner pivot shaft with respect to the outer pivot shaft from the first position; and
energy absorption means, carried between the inner pivot shaft and the outer pivot shaft and acting against the inner pivot shaft, for controlling the movement of the inner pivot shaft from the first position to the second position under impact forces exceeding a predetermined force acting on the inner pivot shaft.

29. The wiper apparatus of claim 28 wherein:
the second position is a position in which a wiper arm mounted on one end of the inner pivot shaft is disposed in a temporary wiping position displaced from a normal wiping position on the vehicle.

30. The wiper apparatus of claim 28 further comprising:
means carried in the outer pivot shaft and engaged by one end of the inner pivot shaft for limiting movement of the inner pivot shaft at a second position of the inner pivot shaft with respect to the outer pivot shaft.

31. The wiper apparatus of claim 28 wherein the energy absorption means comprises:
a deformable mass carried in the outer pivot shaft.

32. The wiper apparatus of claim 31 wherein the mass comprises:
means for controlling the deformation of the mass.

33. The wiper apparatus of claim 32 wherein the controlling means comprises:
  interstices formed through the mass.

34. The wiper apparatus of claim 28 further comprising:
  means for guiding telescoping movement of the inner pivot shaft relative to the outer pivot shaft.

35. The wiper apparatus of claim 34 wherein the guide means comprises:
  at least one complimentary projection and at least one recess formed in the inner pivot shaft and the outer pivot shaft.

36. A method for manufacturing a wiper pivot apparatus capable of lowering a vehicle wiper arm attached to the pivot apparatus from a first normal wiping position to a second lower position under a predetermined impact force, the method comprising the steps of:
  mounting a wiper arm pivot adapted to carry a wiper arm at a first end, in a pivot holder adapted to be fixed to a vehicle;
  forming the wiper arm pivot of an inner pivot shaft telescopingly movable within an outer pivot shaft from a first position placing the wiper arm in a normal wipe position on the vehicle to a second position telescoped within the outer pivot shaft and axially fixed with respect to the pivot holder;
  releasably fixing the inner pivot shaft at the first position to the outer pivot shaft by providing a releasable connector between the inner pivot shaft and the outer pivot shaft at a position to locate the inner pivot shaft at the first position, the inner pivot shaft released from the fixed first position at a predetermined force acting on the inner pivot shaft and subjecting the releasable connector to a force acting along an interface between an inner wall of the outer pivot shaft and an outer wall of the inner pivot shaft; and
  placing energy absorption material between the inner pivot shaft and the outer pivot shaft to control the telescoping movement of the inner pivot shaft between the first and seconds positions.

37. The method of claim 36 further comprising the step of:
  providing the energy absorption material with varying force resistance to movement of the inner pivot shaft relative to the outer pivot shaft over the length of the energy absorption material.

38. The method of claim 36 further comprising the step of:
  guiding the axial movement of the inner pivot shaft within the outer pivot shaft.

39. The method of claim 38 further comprising the step of:
  varying the resistance of movement of the inner pivot shaft to the outer pivot shaft as the inner pivot shaft moves from the first position toward the second position.

40. The method of claim 36 wherein the step of fixing comprises the step of:
  providing means carried in the outer pivot shaft and engaged by the inner pivot shaft for limiting movement of the inner pivot shaft at a second position with respect to the outer pivot shaft.

41. A wiper apparatus for a vehicle comprising:
  a wiper arm pivot including an inner pivot shaft and an outer pivot shaft, the inner pivot shaft telescopingly mounted in the outer pivot shaft for movement between a first position corresponding to a normal wiping position for a wiper arm and a second position with the inner pivot shaft at least partially telescoped within the outer pivot shaft;
  a first member engagable between the outer pivot shaft and the inner pivot shaft when the inner pivot shaft is in the first position, the first member being a shear pin extending between the inner pivot shaft and the outer pivot shaft; and
  an energy absorption member, carried between the inner pivot shaft and the outer pivot shaft and acting against the inner pivot shaft, the energy absorption member capable of controlling movement of the inner pivot shaft from the first position to the second position in response to impact forces exceeding a predetermined force acting on the inner pivot shaft.

42. The wiper apparatus of claim 41 further comprising:
  means for varying the resistance to movement of the inner pivot shaft in the outer pivot shaft as the inner pivot shaft moves from the first position toward the second position.

43. The wiper apparatus of claim 42 wherein the means for varying the resistance comprises:
  means for increasing resistance to movement of the inner pivot shaft relative to the outer pivot shaft as the inner pivot shaft moves from the first position toward the second position.

44. The wiper apparatus of claim 42 wherein the means for varying the resistance comprises:
  means for decreasing the resistance to movement of the inner pivot shaft relative to the outer pivot shaft as the inner pivot shaft moves from the first position toward the second position.

45. The wiper apparatus of claim 41 further comprising:
  a second member engagable by one end of the inner pivot shaft when the first member has broken in response to an excessive force applied to the inner pivot shaft causing movement of the inner pivot shaft from the first position to the second position.

* * * * *

UNITED STATES PATENT AND TRADEMARK OFFICE
CERTIFICATE OF CORRECTION

| | |
|---|---|
| PATENT NO. | : 7,191,487 B2 |
| APPLICATION NO. | : 10/331536 |
| DATED | : March 20, 2007 |
| INVENTOR(S) | : Lee A. Bissonnette et al. |

It is certified that error appears in the above-identified patent and that said Letters Patent is hereby corrected as shown below:

Column 10, Line 6, (Claim 23); Replace "predetennined" with --predetermined--.

Signed and Sealed this

Thirty-first Day of July, 2007

JON W. DUDAS
*Director of the United States Patent and Trademark Office*